(12) United States Patent
Hufton et al.

(10) Patent No.: US 8,795,411 B2
(45) Date of Patent: Aug. 5, 2014

(54) METHOD FOR RECOVERING HIGH-VALUE COMPONENTS FROM WASTE GAS STREAMS

(75) Inventors: Jeffrey Raymond Hufton, Fogelsville, PA (US); Thomas Stephen Farris, Bethlehem, PA (US); Timothy Christopher Golden, Nantes (FR); Eugene Joseph Karwacki, Jr., Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 127 days.

(21) Appl. No.: 13/359,053

(22) Filed: Jan. 26, 2012

(65) Prior Publication Data

US 2013/0019749 A1    Jan. 24, 2013

Related U.S. Application Data

(60) Provisional application No. 61/440,176, filed on Feb. 7, 2011.

(51) Int. Cl.
*B01D 53/04* (2006.01)

(52) U.S. Cl.
USPC .................................. 95/90; 95/127

(58) Field of Classification Search
USPC .......... 96/108, 143–146, 150, 151; 95/90, 95, 95/107, 116, 127, 131, 132, 148
See application file for complete search history.

(56) References Cited

U.S. PATENT DOCUMENTS

| | | | |
|---|---|---|---|
| 1,595,681 A | 8/1926 | Oberfell | |
| 3,384,976 A * | 5/1968 | Westeren | 34/80 |
| 3,874,427 A * | 4/1975 | Tiggelbeck | 141/52 |
| 3,902,874 A | 9/1975 | McAndrew | |
| 3,965,196 A * | 6/1976 | Wood | 568/475 |
| 4,190,423 A | 2/1980 | Winter | |
| 4,842,621 A | 6/1989 | Robbins et al. | |

(Continued)

FOREIGN PATENT DOCUMENTS

| | | |
|---|---|---|
| DE | 38 03 454 A1 | 8/1989 |
| DE | 3803454 A1 | 8/1989 |

(Continued)

OTHER PUBLICATIONS

Pokonova, Y., "Carbon Adsorbents from Petroleum Pitch"; Chemistry and Technology of Fuels and Oils; vol. 37, No. 3; 2001; pp. 206-211.

(Continued)

*Primary Examiner* — Frank Lawrence
(74) *Attorney, Agent, or Firm* — Anne B. Kiernan (57) ABSTRACT

Method for recovering a desired component from a waste gas comprising (a) at an operating facility, introducing a waste gas comprising the desired component and one or more undesired components into an adsorber containing adsorbent material selective for the desired component, adsorbing at least a portion of the desired component therein, (b) terminating flow of waste gas into the adsorber; and (c) recovering and concentrating the desired component by either (1) isolating the adsorber, transporting the adsorber to a central processing facility, or (2) withdrawing from the adsorber an intermediate gas enriched in the desired component, compressing the intermediate gas and storing it in a vessel, isolating the vessel, transporting the vessel to a central processing facility to provide a concentrated product further enriched in the desired component.

17 Claims, 6 Drawing Sheets

(56) References Cited

U.S. PATENT DOCUMENTS

| | | |
|---|---|---|
| 5,152,812 A | 10/1992 | Kovach |
| 5,389,125 A | 2/1995 | Thayer et al. |
| 5,415,682 A | 5/1995 | Zarchy et al. |
| 5,512,082 A | 4/1996 | Zarchy et al. |
| 5,515,845 A * | 5/1996 | Filipovic et al. .......... 128/205.12 |
| 5,704,965 A | 1/1998 | Tom et al. |
| 5,832,713 A | 11/1998 | Maese et al. |
| 5,914,091 A | 6/1999 | Holst et al. |
| 5,928,407 A | 7/1999 | Amlinger |
| 5,985,008 A | 11/1999 | Tom et al. |
| 6,132,492 A | 10/2000 | Hultquist et al. |
| 6,217,633 B1 | 4/2001 | Ohmi et al. |
| 6,236,041 B1 | 5/2001 | Donnerhack et al. |
| 6,277,173 B1 | 8/2001 | Sadakata et al. |
| 6,372,018 B1 | 4/2002 | Cowles |
| 6,408,849 B1 | 6/2002 | Spiegelman et al. |
| 6,478,849 B1 | 11/2002 | Taylor et al. |
| 6,605,134 B2 | 8/2003 | Ishihara et al. |
| 7,169,210 B2 | 1/2007 | Baksh et al. |
| 7,258,725 B2 | 8/2007 | Ohmi et al. |
| 7,261,763 B2 | 8/2007 | Shirley |
| 7,285,154 B2 | 10/2007 | Karwacki, Jr. et al. |
| 7,294,172 B2 | 11/2007 | Baksh et al. |
| 7,442,236 B2 | 10/2008 | Taveira et al. |
| 7,947,118 B2 * | 5/2011 | Rarig et al. ....................... 95/98 |
| 7,951,225 B2 * | 5/2011 | Olander et al. .................. 95/136 |
| 2002/0124726 A1 | 9/2002 | Shah et al. |
| 2002/0162453 A1 | 11/2002 | Kato |
| 2005/0109207 A1 | 5/2005 | Olander et al. |
| 2005/0235828 A1 | 10/2005 | Ishihara |
| 2006/0021421 A1 | 2/2006 | Downie et al. |
| 2006/0107831 A1 | 5/2006 | Karwacki et al. |
| 2007/0273850 A1 | 11/2007 | Brewster |
| 2009/0126733 A1 | 5/2009 | Kulkami et al. |
| 2009/0185969 A1 | 7/2009 | Lose et al. |
| 2010/0098491 A1 | 4/2010 | Monereau et al. |
| 2012/0012201 A1 | 1/2012 | Winchester et al. |

FOREIGN PATENT DOCUMENTS

| | | |
|---|---|---|
| DE | 196 46 791 A1 | 5/1998 |
| EP | 0 437 221 A2 | 7/1991 |
| EP | 0437221 A2 | 7/1991 |
| EP | 0 983 791 A1 | 3/2000 |
| EP | 1 495 793 A1 | 1/2005 |
| FR | 2 317 126 A1 | 2/1977 |
| FR | 2317126 A1 | 2/1977 |
| RU | 115597 | 7/1999 |
| RU | 122631 | 8/2000 |
| TW | 200534911 A | 11/2005 |
| WO | 98/52677 A1 | 11/1998 |

OTHER PUBLICATIONS

U.S. Appl. No. 61/388,279, filed Sep. 30, 2010 entitled "Recovering of Xenon by Adsorption Process" with Andrew David Johnson as the first named inventor.

U.S. Appl. No. 13/236,112, filed Sep. 19, 2011 entitled "Recovering of Xenon by Adsorption Process" with Andrew David Johnson as the first named inventor.

\* cited by examiner

METHOD FOR RECOVERING HIGH-VALUE COMPONENTS FROM WASTE GAS STREAMS

CROSS-REFERENCE TO RELATED APPLICATIONS

This Application claims the priority benefit under 35 USC §119 of U.S. Provisional Application No. 61/440,176, filed on Feb. 7, 2011. The disclosure of the Provisional Application is hereby incorporated by reference in its entirety.

BACKGROUND OF THE INVENTION

Gas mixtures containing high-value components are used in diverse applications such as the fabrication of semiconductor integrated circuits, liquid crystal panels, solar batteries, solar panels, and magnetic disks, and in the manufacture of aerospace equipment and lighting components. High-value gaseous components also are used in various applications in the medical field. The use of these high-value components may generate effluent or waste gases containing the high-value components and in some cases byproduct components, and these components are often present at relatively low concentrations in gas streams that typically comprise inert gases.

Because of the high cost of these components, and also due to the toxicity of some of these components, it is desirable to recover the components for disposal or reuse. Examples of high-value components include, for example, inert noble gases such as xenon, krypton, argon, and helium, and reactive components such as arsine, hydrogen, deuterium, phosphine, germane, $SF_6$, HF, $NF_3$, $CF_4$, $C_2F_6$, and $C_3F_8$.

Adsorption processes are well-known for the separation and recovery of such components from process gas effluents or waste gas mixtures. Representative adsorption processes for this purpose are disclosed, for example, in U.S. Pat. Nos. 6,605,134, 7,258,725, 7,261,763, and 7,285,154.

The economic incentive to recover these high-value components is significant; strict environmental regulations on the discharge of toxic high-value components are expected to continue. There is a need in the art for improved adsorption-based processes to recover and reuse these high-value components in a wide range of applications. This need is addressed by the aspects of the invention described below and defined by the claims that follow.

BRIEF SUMMARY OF THE INVENTION

One aspect of the invention is directed to a method for recovering a desired component from a waste gas mixture, wherein the method comprises
  (a) at an operating facility, introducing a waste gas comprising the desired component and one or more undesired components into an adsorber vessel containing an adsorbent material selective for the desired component, adsorbing at least a portion of the desired component in the adsorbent vessel, and withdrawing therefrom an effluent gas depleted in the desired component;
  (b) terminating the flow of waste gas into the adsorber vessel; and
  (c) recovering and concentrating the desired component by either
    (1) isolating the adsorber vessel, transporting the adsorber vessel to a central processing facility, withdrawing from the adsorber vessel an intermediate gas enriched in the desired component, and separating the desired component from the intermediate gas to provide a concentrated product gas further enriched in the desired component, or
    (2) withdrawing from the adsorber vessel an intermediate gas enriched in the desired component, compressing the intermediate gas and storing it in a pressure vessel, isolating the pressure vessel, transporting the pressure vessel to a central processing facility, withdrawing the intermediate gas from the pressure vessel, and separating the desired component from the intermediate gas to provide a concentrated product gas further enriched in the desired component.

The operating facility may be one of a plurality of operating facilities. The method may include adsorbing on the adsorbent material at least one other component prior to adsorbing the desired component in the adsorbent vessel in step (a), wherein the desired component is more strongly adsorbed by the adsorbent material than the other component. The other component may be one of the undesired components.

The adsorption of the other component may be effected at or below a selected pressure and the adsorption of the desired component may be effected at a pressure equal to or greater than the selected pressure. Alternatively, the adsorption of the other component may be effected at a selected pressure and the adsorption of the desired component may be effected at a pressure less than the selected pressure.

The adsorption of the other component may be effected at the central processing facility to provide an adsorber vessel containing adsorbent material having the other component adsorbed thereon, the adsorber vessel may be transported to one of the operating facilities, and the waste gas may be introduced into the adsorber vessel in step (a).

The withdrawal of the intermediate gas enriched in the desired component may be effected by regenerating the adsorbent material using depressurization, evacuation, heating, purging, or any combination thereof. The flow of waste gas into the adsorber vessel may be terminated at breakthrough of the desired component.

The effluent gas depleted in the desired component may be introduced into an additional adsorber vessel containing the adsorbent material selective for the desired component; the flow of waste gas into the adsorber vessel may be terminated at a time between the breakthrough of the desired material and saturation of the adsorbent material with the desired component, inclusive; flow of waste gas into the adsorber vessel may be terminated; flow of waste gas into the additional adsorber vessel may be initiated; and an effluent gas depleted in the desired component may be withdrawn therefrom. The adsorber vessel may be transported to the central processing facility, the intermediate gas enriched in the desired component may be withdrawn from the adsorber vessel, and the desired component may be separated from the intermediate gas to provide the concentrated product gas further enriched in the desired component.

The method may include one or more cooling steps selected from the group consisting of cooling the waste gas prior to introduction into the adsorber vessel, external cooling of the adsorber vessel, and internal cooling of the adsorber vessel.

The desired component may be selected from the group consisting of xenon, krypton, argon, helium, hydrogen, deuterium, arsine, phosphine, germane, $SF_6$, $SiH_4$, $H_2Se$, HF, $NF_3$, $CF_4$, $C_2F_6$, $C_3F_8$, and Fluothane® anesthetic gas. (Fluothane® is a registered trademark of AstraZeneca UK Ltd.) Fluothane® is 2-bromo-2-chloro-1,1,1-trifluoroethane ($C_2HBrClF_3$). The one or more undesired components may be selected from the group consisting of nitrogen, oxygen, hydrogen, helium, krypton, and argon. The desired component may be xenon and the undesirable component may be nitrogen.

The separating of the desired component from the intermediate gas to provide the concentrated product gas further enriched in the desired component at the central processing facility may be effected by cryogenic distillation.

Another aspect of the invention relates to a method for recovering a desired component from a waste gas mixture, wherein the method comprises
(a) providing an adsorption-based recovery system at an operating facility wherein the system is adapted to recover the desired component from a waste gas comprising the desired component and one or more undesired components, wherein the desired component is recovered and concentrated in a transportable vessel;
(b) providing a central processing facility adapted to receive the transportable vessel, to withdraw therefrom an intermediate gas enriched in the desired component, and to separate the desired component from the intermediate gas to provide a concentrated product gas further enriched in the desired component;
(c) introducing the waste gas into the adsorption-based recovery system at the operating facility and recovering and concentrating the desired component in the transportable vessel;
(d) transporting the transportable vessel to the central processing facility; and
(e) separating the desired component from the intermediate gas and providing the concentrated product gas further enriched in the desired component.

The operating facility may be one of a plurality of operating facilities. At the operating facility, the method may be carried out by steps wherein
(1) the waste gas is introduced into an adsorber vessel containing an adsorbent material selective for the desired component, at least a portion of the desired component is adsorbed in the adsorbent vessel, and an effluent gas depleted in the desired component is withdrawn therefrom;
(2) the flow of waste gas into the adsorber vessel is terminated; and
(3) the adsorber vessel is isolated, the adsorber vessel is transported to the central processing facility, the intermediate gas enriched in the desired component is withdrawn from the adsorber vessel, and the desired component is separated from the intermediate gas to provide the concentrated product gas further enriched in the desired component.

Following withdrawal of the intermediate gas from the adsorber vessel, the adsorber vessel may be pressurized with a gas containing at least one other component, wherein the desired component is more strongly adsorbed by the adsorbent material than the other component, and the adsorber vessel may be isolated and transported to one of the operating facilities for use in step (1).

The at least one other component may be one of the undesired components. The concentrated product gas may be introduced into a pressure vessel and transported to one of the plurality of operating facilities for reuse in a process that generates the waste gas.

At the operating facility, the method may be carried out by steps wherein
(1) the waste gas is introduced into an adsorber vessel containing an adsorbent material selective for the desired component, adsorbing at least a portion of the desired component in the adsorbent vessel, and withdrawing therefrom an effluent gas depleted in the desired component;
(2) the flow of waste gas into the adsorber vessel is terminated;
(3) an intermediate gas enriched in the desired component is withdrawn from the adsorber vessel, the intermediate gas is compressed and stored in a pressure vessel, and the pressure vessel is isolated; and
(4) the pressure vessel is transported to the central processing facility, the intermediate gas is withdrawn from the pressure vessel, and the desired component is separated from the intermediate gas to provide the concentrated product gas further enriched in the desired component.

A further aspect of the invention relates to a system for recovering a desired component from a waste gas mixture. The system comprises an adsorption-based recovery system at an operating facility wherein the adsorption-based recovery system is adapted to recover and concentrate the desired component from a waste gas comprising the desired component and one or more undesired components to provide a concentrated amount of the desired component. The system also includes a transportable vessel adapted to contain and transport the concentrated amount of the desired component from the operating facility to a central processing facility, wherein the transportable vessel may comprise either (1) a pressure vessel adapted to receive and contain the concentrated amount of the desired component as a compressed gas, or (2) a pressure vessel packed with adsorbent material adapted to contain at least a portion of the concentrated amount of the desired component in an adsorbed state. In addition, the system includes a final recovery and concentration system adapted for the further recovery and concentration of the desired component at the central processing facility to provide a concentrated compressed product gas enriched in the desired component.

DETAILED DESCRIPTION OF THE INVENTION

The recovery of a high-value desired component from effluent or waste gas mixtures may be accomplished by the methods described below wherein the high-value desired component is recovered and concentrated by adsorption-based processes. An initial step is carried out at an operating facility having a process operation that uses the high-value desired components and generates the effluent or waste gas mixture as a process offgas stream, wherein the high-value component is removed from the effluent or waste gas mixture by selective adsorption. After adsorption is complete, the adsorber vessel containing adsorbed components may be isolated and shipped to a central processing facility for further concentration and recovery. Alternatively, the adsorber vessel may be regenerated by known regeneration methods with the desorbed components withdrawn, compressed, and stored in a transportable gas storage vessel. The vessel then may be shipped to the central processing facility for further concentration and recovery of the high-value desired component. Alternatively, the desorbed components withdrawn from the adsorber vessel may be compressed and fed to a second adsorber to perform a secondary enrichment of the recovered high-value desired component to further reduce costs to transport the material after recovery. In this way, the adsorption bed using the enriched feed gas will produce a further enrichment in the high-value desired component relative to using the non-enriched feed gas stream. In some cases the further enriched product may be recycled immediately to the process operation for reuse.

After final recovery and concentration of the high-value desired component at the central processing facility, the regenerated adsorber vessel or the empty gas storage vessel may be returned for reuse at the operating facility or shipped for use at another similar operating facility. In addition, the recovered high-value desired component may be shipped for reuse at the operating facility or another similar facility. The recovery method utilizes a plurality of operating facilities that generate the process effluent gas mixtures and operate in conjunction with the central processing facility, wherein adsorber vessels and gas storage vessels are returned as needed to the operating facilities.

Another aspect of the invention is the adsorption of at least one other component on the adsorbent material after regeneration at the central processing facility prior to returning the adsorber vessel for use at an operating facility. Alternatively, the adsorption of at least one other component on the adsorbent material may be carried out at the operating facility prior to the recovery of the high-value desired components. As described in more detail below, this aspect of the invention has the benefit of reducing the heat of adsorption when the gas mixture containing the high-value desired component is passed through the adsorber vessel when compared with the use of a newly-regenerated adsorber vessel.

The term "component" as used herein is an element or compound contained in a gas or gas mixture. A desired component is a high-value, expensive, or toxic component that is recovered from a process effluent gas, process offgas, or waste gas mixture from a process. The recovered desired component may be reused in the process that generates the process effluent, process offgas, or waste gas. An undesired component is any component other than a desired component. One or more desired components may be recovered in a process using the methods described herein.

An operating facility is a location utilizing a process and process equipment that generates a process effluent gas, process offgas, or waste gas mixture containing a high-value component. The operating facility may be one of a plurality of operating facilities wherein each operating facility generates a process effluent gas, process offgas, or waste gas mixture containing the same desired component or different desired components. The term "central processing facility" is defined as process equipment comprising a final recovery and concentration system adapted to recover and concentrate a desired component from an intermediate gas containing the desired component and one or more undesired components. The operating facilities may be located at varying distances from the central processing facility.

An intermediate gas is defined as a gas mixture enriched in a desired component that is obtained by adsorptive treatment of a process effluent gas, process offgas, or waste gas mixture containing a high-value desired component. The intermediate gas is obtained by the regeneration of an adsorber vessel containing adsorbed desired component. A compressed gas is defined as a component or mixture of components in a gaseous state at a pressure above atmospheric pressure or in a compressed fluid state at a pressure above the critical pressure of the component or mixture of components.

The term "concentrated amount" is defined as an amount of the desired component that exists at a higher volume concentration than the concentration of the desired component in an initial mixture of the desired component and one or more undesired components. The concentrated amount of the desired component may exist as a compressed gas, an adsorbed gas, or a combination of a compressed gas and an adsorbed gas.

A more strongly adsorbed component is a component that is adsorbed selectively by an adsorbent material relative to another component that is less strongly adsorbed on the adsorbent material. An adsorption-based recovery system is defined as a system for the recovery of a desired component wherein the system comprises at least an adsorber vessel containing adsorbent material capable of selectively adsorbing the desired material. The adsorption-based recovery system may also include other process equipment adapted to regenerate the adsorber vessel after the desired component has been adsorbed therein, to collect intermediate gas enriched in the desired component after regeneration, and to compress the intermediate gas. A transportable vessel is any vessel that can be legally transported by truck, train, plane, ship, or barge.

The term "breakthrough" relates to the concentration of a desired component in an adsorber effluent gas during an adsorption step and is the point in time at which this concentration reaches a predetermined value. The term "saturation" refers to the condition of an adsorber vessel in which the concentrations of the desired component in the feed gas to the vessel and the effluent gas from the vessel are equal.

The indefinite articles "a" and "an" as used herein mean one or more when applied to any feature in aspects of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The system for recovering the desired component at an operating facility utilizes standard process equipment including pressure vessels, piping, valves, manifolds, pressure indicators, flow controllers, and compressors and/or vacuum pumps. The system also may include heating equipment adapted to heat gas streams, the exterior of pressure vessels, or the interior of pressure vessels to enhance regeneration. The pressure vessels used as adsorber vessels contain adsorbent material in the form of pellets, beads, extrudates, formed monoliths, or any other desired type of adsorbent structure; the adsorbent material is loaded and contained in the vessels by any method known in the art. The adsorbent material is selective for the adsorption of the desired component over the undesired components in the waste gas and may be any material adapted for gas adsorption such as activated carbon, zeolite, activated alumina, and silica gel. The system components may be adapted for the regeneration of adsorber vessels following an adsorption step as described below.

An adsorber vessel may be a horizontal or vertical pressure vessel with a port or opening at each end, one of which provides an adsorber inlet and the other of which provides an adsorber outlet. Alternatively, the adsorber vessel may be a typical compressed gas cylinder having a port or opening only at one end of the cylinder. In this case, a valve and dip tube assembly may be used as is known in the art (similar to the one disclosed in U.S. Pat. No. 5,985,008) in which feed gas flows through the dip tube to the bottom of the cylinder, gas flows through the adsorbent material, and effluent gas flows out at the top of the cylinder. The opposite flow direction may be used wherein the feed gas enters through the top of the annular space in the dip tube assembly and effluent gas is withdrawn from the bottom of the cylinder via the dip tube. Alternatively, the adsorber vessel may be a drum or other type of sealed container. The vessel may be constructed of steel, aluminum, polymeric material, or a composite material.

It may be advantageous to place a collection vessel upstream of the adsorption vessel to buffer the flow of waste gas from the process that generates the waste gas. A compressor may be utilized to pressurize and stabilize the flow of waste gas from the collection vessel to the adsorption vessel. The collection vessel will reduce fluctuations in gas pressure and flow rate that could compromise the efficiency of the adsorption process.

The adsorber vessel should be designed to maximize the amount of adsorbent contained therein so that dead volume is minimized. The vessel should be adapted for the introduction of waste gas into one end of the packed adsorbent bed and the withdrawal of a vent gas or effluent gas from the other end of the packed adsorbent bed. The vessel should be designed for convenient, safe, and legal transportation between the operating facility and the central processing facility. The adsorber vessel can be a single transportable vessel or may be one of multiple vessels installed in a transportable skid. The adsorber vessel design should meet required shipping regulations, desired fill pressures, hazard regulations regarding the desired and undesired components, and the cost of manufacture of the vessels.

The operation of the adsorber vessels includes the usual step of adsorption in which the waste gas is passed through the adsorbent material, the desired component is selectively adsorbed by the adsorbent, and effluent gas depleted in the desired component is withdrawn from the vessel. This effluent gas may be vented, processed further, and/or reused in another process. The adsorption step is terminated at a predetermined elapsed time or when a predetermined concentration of the desired component is observed in the effluent gas from the adsorber vessel. This concentration may be a low concentration that indicates breakthrough has occurred, or alternatively may be a higher concentration that approaches the concentration in the waste gas feed to the adsorber vessel, which indicates approach to saturation of the adsorbent with the desired component. The adsorber vessel may be operated to complete saturation with the desired component. At least a portion of the desired component will be in the adsorbed state in the adsorber vessel. Typically, most of the desired component is in the adsorbed state with a small amount of the desired component being present in the gaseous or fluid state in the interstitial volume of the adsorbent bed and in any dead volume in the adsorber vessel and associated piping.

Regeneration of an adsorber vessel after termination of the adsorption step may be effected by any known regeneration method including depressurization, evacuation, heating, purge, or combinations thereof. The gas withdrawn during regeneration is enriched in the desired component and may be considered as an intermediate gas that can be separated to provide a concentrated product gas further enriched in the desired component.

In one aspect of the invention, regeneration is carried out at the operating facility and the gas withdrawn during regeneration is compressed and stored in a transportable version of a pressure vessel described above. The vessel is transported to the central processing facility, the intermediate gas is withdrawn from the pressure vessel, and the desired component is separated from the intermediate gas to provide a concentrated product gas further enriched in the desired component. This separation may be effected by distillation, pressure or vacuum swing adsorption, membrane permeation, or any other suitable separation method. The concentrated product gas comprising the desired component may be compressed, stored in the vessel, and shipped to any of the operating facilities for reuse in the process that generates the waste gas. Alternatively, the intermediate gas may be used as feed to another adsorber vessel. Since this gas is concentrated in the high-value component, subsequent regeneration of the adsorber vessel with enriched high-value component in the feed gas will produce a further-enriched desorbed gas. Such further enrichment may be done by using a second adsorber vessel. This may reduce transportation costs and facilitate upgrading to a pure product at the central processing facility.

In another aspect of the invention, the adsorber vessel is isolated at breakthrough and shipped to the central processing facility for regeneration. The gas withdrawn from the adsorber vessel is an intermediate gas enriched in the desired component, and this gas is subjected to further separation to provide a concentrated product gas further enriched in the desired component. This separation may be effected by distillation, (that may be cryogenic) pressure or vacuum swing adsorption, membrane permeation, or any other suitable separation method. The concentrated desired component may be compressed, stored in a transportable pressure vessel, and shipped to any of the operating facilities for reuse in the process that generates the waste gas. In addition, the regenerated adsorber vessel may be shipped to any of the operating facilities for reuse in the adsorption process that recovers the desired component from the waste gas.

The adsorption step in which the gas mixture is contacted with fully-regenerated adsorbent material in the adsorber vessel may generate a significant heat of adsorption. If this occurs, the efficiency of the recovery step will be reduced because the amount of gas adsorbed decreases as temperature increases. A small part of the heat of adsorption is generated by adsorption of the desired high-value components because they typically are present at low concentrations. Most of the heat of adsorption is generated by co-adsorption of the remaining undesired components in the gas mixture on the previously-regenerated adsorbent.

The adverse effects of the heat of adsorption on process performance may be reduced or eliminated by various heat management steps such as feed gas precooling, external cooling of the adsorber vessel, or internal cooling by heat exchange within the vessel. However, it may be undesirable for various reasons to provide such heat management steps at the operating facility. One aspect of the invention addresses this problem by the use of an additional process step that may be carried out at the central processing facility. In this step, which may be defined as a pretreatment or preadsorption step, at least one other component is adsorbed on the adsorbent material prior to adsorbing the desired component in the adsorbent vessel at an operating facility. The at least one other component is less strongly adsorbed by the adsorbent material than the desired component, i.e., the adsorbent is selective for the desired component over the other component. The at least one other component may be one of the undesired components in the gas mixture generated at the remote onsite facilities and/or may comprise additional components that are less strongly adsorbed than the high-value desired component. For example, the undesired components adsorbed on the adsorbent material in the preadsorption step may be selected from nitrogen, oxygen, helium, argon, air or mixtures of the above gases. For some methods inert gases such as nitrogen, argon or helium are preferred. The vessel may be pressurized in the preadsorption step to a pressure below, equal to, or above the anticipated adsorption pressure used at an operating facility. It may be desirable to pressurize the vessel initially to a pressure significantly above the anticipated adsorption pressure. The adsorber vessel at the desired pressure is then shipped to the operating facility for reuse in the adsorption process that recovers the desired component from the waste gas.

While it is desirable to carry out this preadsorption step at the central processing facility, there may be cases in which the preadsorption step is preferably carried out at an operating facility. In this case, the adsorber vessel after regeneration at either the operating facility or the central operating facility may be pressurized to or slightly above atmospheric pressure with inert gas or a gas containing undesirable components prior to further pressurization.

In another aspect of the invention, the adsorption step in which the desired component is recovered from the waste gas in a first adsorber vessel may be operated past breakthrough in order to maximize the utilization of the adsorbent material. A second adsorber vessel that has been regenerated and optionally subjected to preadsorption as described above is connected to the outlet of the first adsorber at a time prior to breakthrough, and the effluent gas depleted in the desired component is introduced into the second adsorber. After breakthrough, the desired component in the first adsorber effluent is adsorbed in the second adsorber, and operation of the two adsorbers in series continues until the adsorbent in the first adsorber is saturated with respect to the desired component in the waste gas feed. At this point, the waste gas stream is switched to the inlet of the second adsorber, the first adsorber is isolated, and the isolated first adsorber is regenerated at the operating facility or shipped to the central processing for regeneration as described above. A third regenerated adsorber is connected in series with the second adsorber so that effluent gas from the second adsorber is fed to the third adsorber, and this series operation is continued in a cyclic manner.

The aspects of the invention described above may be applied to the recovery of one or more high-value desired components selected from, but not limited to, inert noble gases such as xenon, krypton, argon, and helium, as well as reactive components such as arsine, phosphine, germane, $SF_6$, HF, $NF_3$, $CF_4$, $C_2F_6$, $C_3F_8$, $SiH_4$, $H_2Se$, $H_2$, $D_2$, and $NH_3$, and anesthetic gases such as Fluothane®. The undesired components in the waste gas or process effluent gas streams may include any of the components nitrogen, oxygen, hydrogen, helium, argon, and air. These waste gas or process effluent gas streams may be produced in the fabrication of semiconductor integrated circuits, liquid crystal panels, solar batteries, solar panels, and magnetic disks, and in the manufacture of aerospace equipment and lighting components. These effluent gas streams also may be produced in various applications in the medical field.

The methods described above are illustrated below by the recovery of xenon as the desired component from a mixture of xenon and nitrogen, wherein nitrogen is the undesired component.

Xenon is used in the fabrication of integrated circuits (anisotropic etching), the aerospace industry (ion propulsion engines for satellites), various lighting applications (headlights), and the manufacture of flat panel displays. It is used in the medical field as a neuroprotectant and an anesthetic gas, and also is used in tomography (organ spectroscopy). During the use of xenon in these applications, an effluent gas, process offgas, or waste gas stream may be generated at the operating facility that contains a dilute mixture of xenon (e.g., <2 volume %) in an inert gas such as nitrogen. Because this waste gas stream may be generated intermittently at varying flow rates, it is often desirable to collect this gas in a holding tank or vessel prior to xenon recovery.

Figure 1:
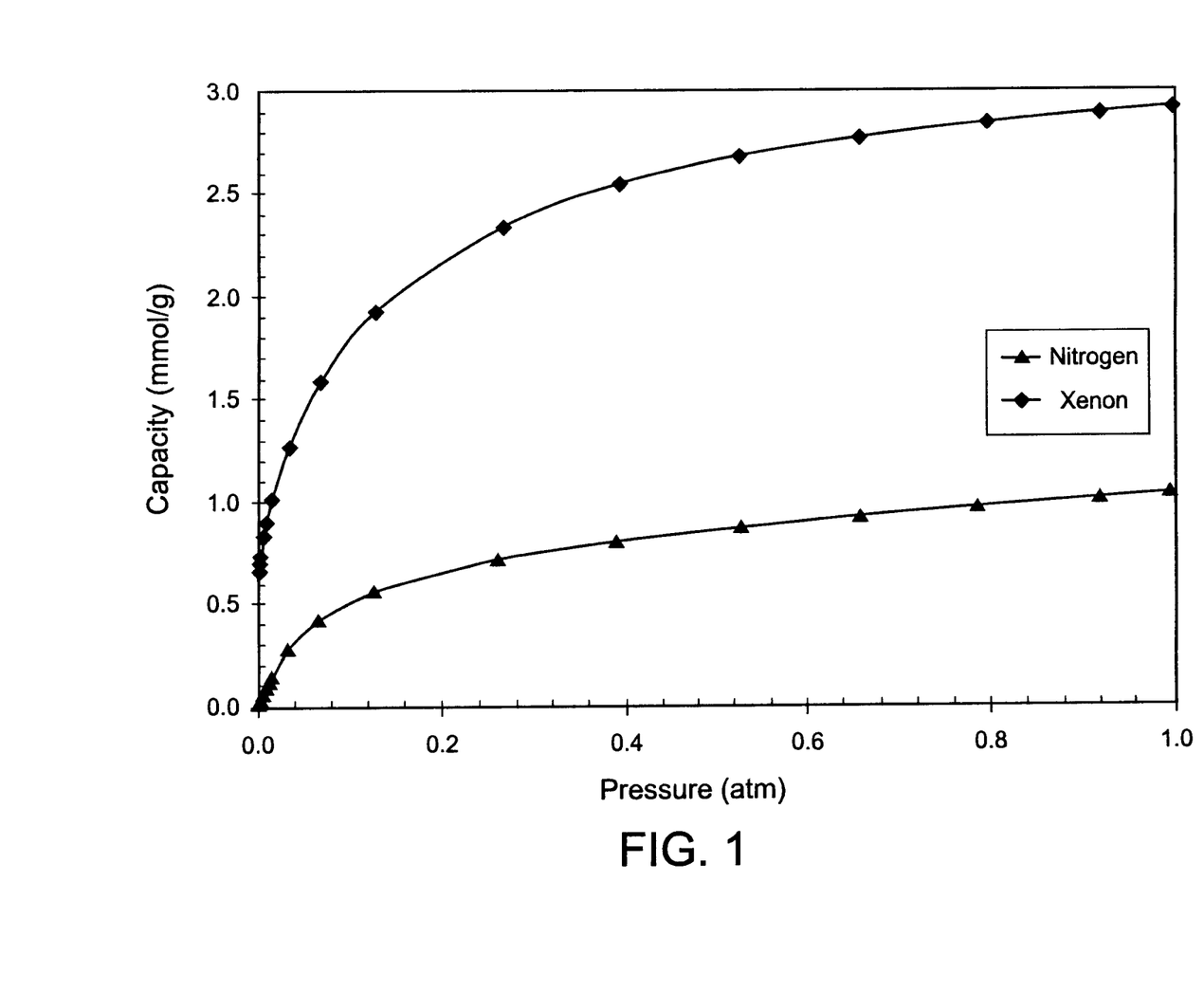
FIG. 1 presents adsorption isotherms for the adsorption of xenon and nitrogen on AgLiLSX zeolite at 0° C.

For large scale processes, it may be possible to recover xenon from these waste gas streams at the operating facility at which the waste gas streams are generated. In many cases, however, it may be impractical to purify the xenon onsite at the operating facility, because the amount of xenon that can be recovered may not justify the cost of an on-site recovery system, and so the xenon in the waste gas may be concentrated in accordance with this invention and transported to a central processing facility where xenon and nitrogen may be separated by distillation or other purification methods. In this illustration, the dilute xenon/nitrogen process effluent or waste gas is compressed to an adsorption pressure between 20 and 1800 psia and is fed to an adsorbent vessel containing the zeolite AgLiLSX at ambient temperature. Alternatively, the adsorption step can be operated at reduced temperature by refrigerating the waste gas stream and/or cooling the adsorbent material or adsorbent vessel. Xenon is selectively adsorbed on the adsorbent, some of the nitrogen also is adsorbed, and the unadsorbed nitrogen is vented from the adsorber vessel. The selectivity of AgLiLSX for xenon over nitrogen is illustrated in FIG. 1, which gives adsorption isotherms for xenon and nitrogen at 0° C. To reduce the volume of gas transported from an operating facility, it may be advantageous to employ the adsorption vessel or a second adsorption vessel to further enrich the recovered high value component to a higher concentration.

The waste gas flow is continued until xenon breakthrough occurs in the vent gas, the adsorber vessel is isolated and disconnected, and the waste gas flow is switched to another previously regenerated adsorber vessel. The isolated adsorber vessel is shipped to the central separation facility and regenerated to provide an intermediate xenon-nitrogen stream, and this intermediate stream is processed to recover the xenon from the xenon/nitrogen mixture by cryogenic distillation. The xenon is recovered the central separation facility at a purity of at least 98 volume % and up to 100 volume %.

Figure 2:
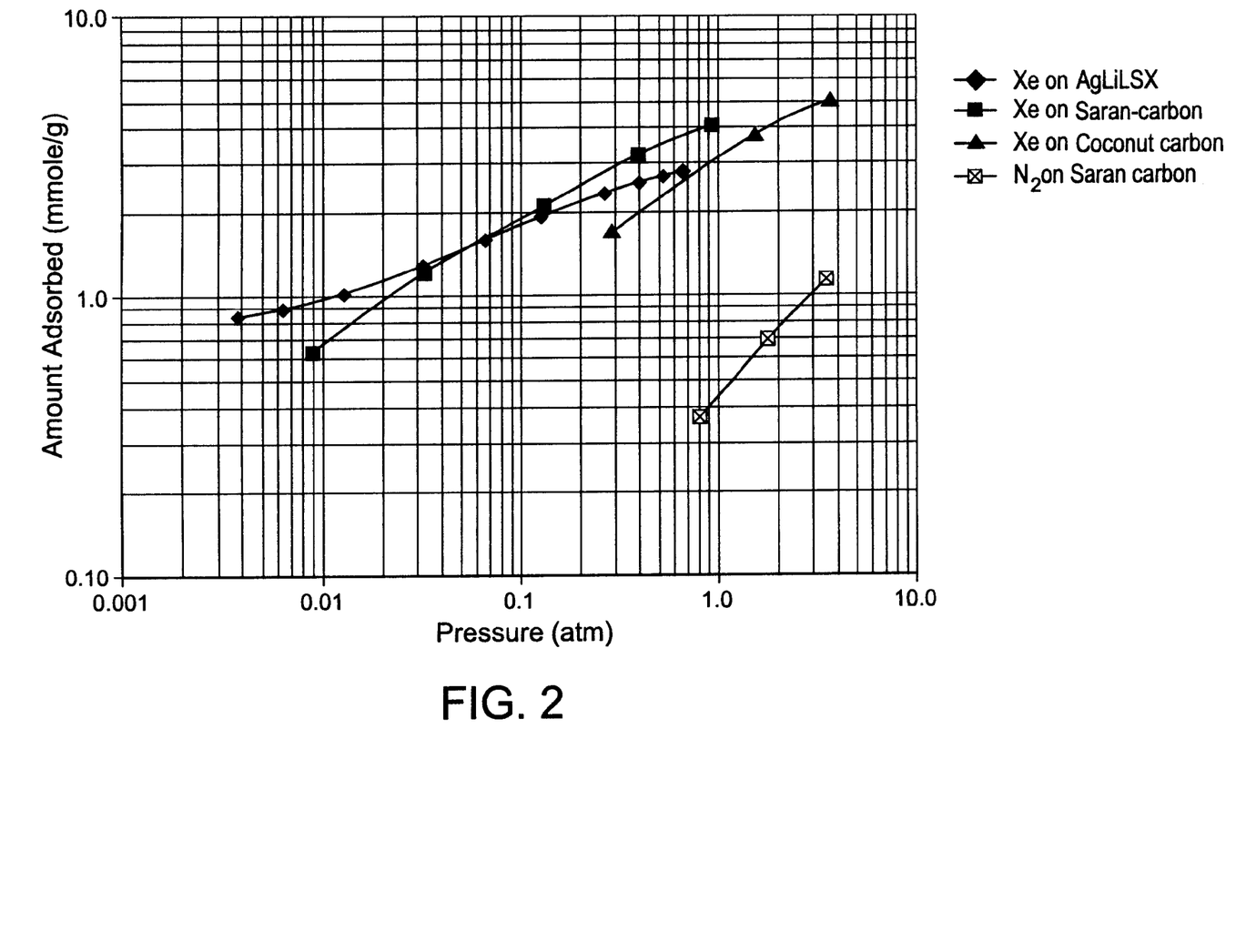
FIG. 2 presents adsorption isotherms for the adsorption of xenon and nitrogen on carbon-based adsorbents at 30° C.

While the zeolite adsorbent AgLiLSX is used as illustrated above, alternative xenon-selective adsorbents such as activated carbon, silica gel, and activated alumina may be used. Adsorption isotherms for Xe and $N_2$ on saran-derived activated carbon and coconut shell activated carbon are presented in FIG. 2. These isotherms show that Xe is more strongly adsorbed on the saran-based carbon than $N_2$, and saran-based carbon is therefore a useful adsorbent for the process described herein. Adsorbent particle size may range from 0.1 to 3 mm, and the particle size distribution should be as narrow as possible to maximize adsorbent packing density. Spherical adsorbent particles may be used to maximize adsorbent packing density. At least 90% of the adsorber vessel internal volume should be packed with the adsorbent.

The adsorbent may be placed directly in the adsorber vessel or preferably may be supported at one or both ends by screen supports as is known in the art. The adsorbent should be packed as tightly as possible to maximize the storage capacity of the adsorber vessel for the desired component. Snowfall loading techniques are commonly used for the dense packing adsorber vessels and are advantageous for the application described here.

The adsorbent must be in an activated condition prior to the adsorption step to recover the desired component. This can be achieved by loading previously regenerated adsorbent in the adsorber vessel under an inert gas atmosphere, e.g., in a glove box assembly or with a continuous inert gas purge through the vessel. The regenerated adsorbent may be provided by heating spent adsorbent to at least 120° C. in a flowing inert gas stream for at least 4 hours. Alternatively, it is possible to load adsorbent into the adsorber vessel and regenerate it in situ. This can be accomplished by external heating of the adsorber vessel while evacuating the vessel to low pressure and/or purging it with an inert gas. It is also possible to heat the vessel by purging with a hot inert gas.

The internal surfaces of the adsorber vessel may be cleaned with typical cleaning solutions prior to adsorbent loading to eliminate impurities that could be introduced into the central processing facility during the desorption step. Once the adsorber vessel is packed with adsorbent in an activated condition and prior to treatment of the waste gas, the vessel may be pretreated remove any impurities from the gas voids that would contaminate the intermediate gas during desorption. The pretreating process may include initial evacuation to a very low pressure and purging with one or more undesired gas components or inert gas to effectively displace any remaining impurity gases. The adsorber vessel may be filled with the undesired gas components or inert gas to a positive pressure (i.e., greater than atmospheric pressure) to prevent air ingress and possible contamination during storage and shipping of the vessel.

As discussed above, it is beneficial to pressurize the vessel at the central processing facility with gas containing an undesired component or undesired components to an elevated pressure equal or greater than the adsorption pressure that is used in the adsorber vessel to selectively adsorb xenon from the waste gas. Nitrogen is used as the undesired component in this illustration. When the undesired gas is adsorbed during this pressurization step, heat will be generated and the adsorbent temperature will increase. The vessel may be overfilled in a prior step as described above with the undesired component or components to a predefined higher pressure; this pressure will decrease to the adsorption pressure once the vessel cools to ambient temperature. Alternatively, the vessel may be placed in a fluid bath to help remove heat and maintain the adsorbent temperature at ambient conditions during the pressurization process. It is also possible to cool the adsorbent via internal or external piping containing a cooling fluid inside the vessel or in contact with the exterior of the vessel. Following this pretreatment or preadsorption step, the adsorber vessel is isolated and shipped to one of the operating facilities for use in another xenon recovery step.

The adsorbent-filled vessel is installed at the operating facility by connecting the waste gas piping to the inlet fitting of the vessel and connecting the vent gas piping to the outlet fitting of the vessel. An inert gas supply and a vent gas line in the waste gas piping is beneficial to flush the piping with inert gas before the waste gas flow is initiated to the adsorber vessel to prevent air infiltration into the system. If the waste gas is available at a pressure greater than or equal to the adsorption pressure, it can be directly fed to the adsorber vessel. If it is available at a lower pressure, a compressor or blower would be needed to increase the pressure of the waste gas to the adsorption pressure.

The adsorber vessel may be connected in series with a process vent. This allows the upstream process that generates the waste gas to continue operation while an adsorber vessel taken offline for changeout or maintenance. This also allows diversion of the waste gas to vent during time periods when the upstream processing generates a waste gas having a xenon concentration that is below a desired concentration for recovery. This leads to improved operability and increases the amount of xenon that can be recovered in the adsorber vessels.

The vent gas piping should include a device to vent the undesired gas component from the adsorber vessel. This may be a block valve periodically opened as needed to vent accumulated gas, or may be manual or automated control valve which can be adjusted to continuously withdraw undesired gas and maintain the required pressure level in the adsorber vessel. Advantageously, the system may utilize a simple backpressure regulator which automatically vents undesired gas when the backpressure exceeds the desired adsorption pressure set point. A vent line may be provided to permit depressurization of the vent gas piping when the absorber vessel is changed out.

Figure 3:
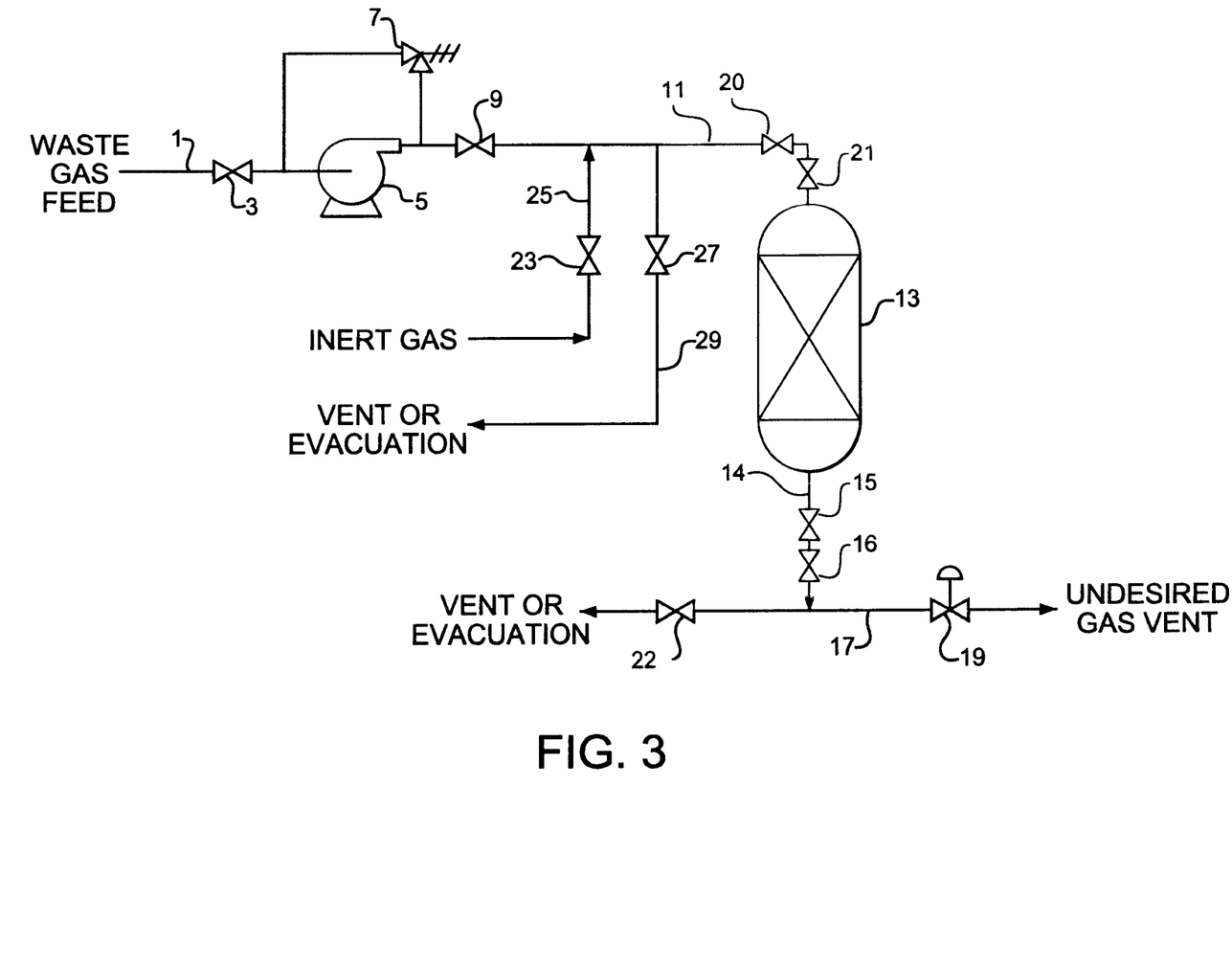
FIG. 3 is a schematic flow diagram for an adsorption system adapted to recover and concentrate one or more desired components from a waste gas mixture according to aspects of the present invention.

A process flow diagram of an exemplary recovery system for use with the methods described herein is given in FIG. 3. The embodiment shown in FIG. 3 may be a portion of a recovery system that may be located at an operating facility. The system comprises waste gas feed inlet line 1, inlet valve 3, gas blower or compressor 5 with safety relief valve 7, discharge valve 9, and compressed feed inlet manifold 11. If the waste gas feed is available at an elevated pressure, gas blower or compressor 5 may not be needed. Inlet manifold 11 connects with the inlet of adsorber vessel 13 containing adsorbent material selective for the adsorption of the desired component or components to be recovered from the waste gas feed. Inlet manifold 11 is shown with two valves 20 and 21 located on one side of vessel 13 and two valves 15 and 16 in line 14 on the other side of vessel 13, which may be useful for the installation and removal of vessel 13. Between valves 15 and 16 and between valves 20 and 21 are removable piping connections (not shown). Adsorber vessel outlet valves 15, 16 are connected to discharge manifold 17 having flow control valve 19 through which undesired gas may be vented. Manifold 17 also includes vent or evacuation valve 22 through which gas may be withdrawn by venting or evacuation from adsorber vessel 13 during adsorbent regeneration and/or process steps for recovering the desired component or components. Inert gas may be provided via valve 23 and line 25 into manifold 11 for purging during adsorbent regeneration and/or process steps for recovering the desired component or components. In addition, gas may be vented or evacuated via valve 27 and line 29 during adsorbent regeneration and/or recovery of the desired component or components.

In one embodiment, the recovery step is initiated by passing waste gas into adsorber vessel 13 at a flow rate between about 10 cc/min and about 100 l/min at an adsorption pressure between 20 and 1800 psia. The adsorber vessel initially may contain undesired gas at a pressure lower than the desired adsorption pressure. In this case, the waste gas flow will slowly pressurize the adsorber vessel to the adsorption pressure, and this pressure will be controlled by the backpressure regulator. Heat will be generated during this slow pressurization step due to adsorption of the desired and undesired gas components. The temperature in the adsorber vessel will depend largely on the rate of waste gas feed, the geometry of the adsorber vessel, and the effective rate of heat transfer from the walls of the adsorber vessel. If necessary, thermal management approaches described above can be implemented during this step.

The undesirable effects of the heat of adsorption may be mitigated by initially filling adsorber vessel 13 with the undesired gas component or components, for example nitrogen, at the adsorption pressure in a preadsorption step as described above and as described below for one embodiment of the invention with reference to FIG. 6. The waste gas then is fed to the adsorber vessel at the same pressure, and the pressure is maintained at the adsorption pressure via the backpressure regulator. In this alternative, the adsorbent is previously saturated with the adsorbed undesired component, and the desired gas component will preferentially adsorb and displace some of the adsorbed undesired component. The endothermic heat of desorption of the undesired component will offset the exothermic heat of adsorption of the desired component, thereby resulting in very low levels of heat evolution and essentially isothermal operation of the adsorber vessel. This can greatly simplify the recovery system because thermal management equipment at the operating facility may be unnecessary or the thermal load on it, if present, may be reduced.

Adsorber vessel 13 may be placed in a bath (not shown) or mechanical device (not shown) to cool the vessel before and/or during the adsorption step. The waste gas also may be chilled prior to entering the adsorber vessel. The process is carried out at 0° C. in this illustration as indicated in FIG. 1, but temperatures may range from room temperature to −100° C. or more specifically from 10° C. to −20° C. The advantage of using sub-ambient temperatures is the increased loading of xenon on the adsorbent and possibly higher xenon adsorption selectivity. This increases the fraction of the xenon adsorbed from the waste gas, which in turn yields higher xenon levels in the desorbed intermediate gas treated at the central processing facility. A beneficial approach is to saturate the chilled adsorber vessel with the waste gas at a lower pressure than the maximum allowable pressure in the adsorber vessel at ambient temperature. The initial pressure should be selected so that when the vessel warms to ambient temperature, the pressure in the vessel remains below the maximum allowable vessel pressure.

When the xenon capacity of the adsorbent in adsorber vessel 13 is approached, xenon breakthrough will occur. The concentration of xenon that defines breakthrough varies depending on the desired degree of xenon recovery, the concentration of xenon in the waste gas, and the specific arrangement of adsorber vessels at the operating facility. The defined breakthrough concentration may range from 1 ppmv to 1 volume %. At this point, the waste gas flow is switched to another fresh adsorber vessel (not shown), and the adsorber vessel 13 is isolated, disconnected from the system, between valves 20 and 21 and valves 15 and 16 and shipped to the central processing facility.

Any applicable type of gas analyzer may be utilized to determine the concentration of xenon in the adsorber effluent or vent gas stream as a function of time. For example, a mass spectrometer, gas chromatograph, or ultrasonic-based analyzer may be used to measure the xenon concentration in the adsorber effluent.

Another approach is possible to maximize the recovery of xenon wherein two adsorber vessels are connected in series (not shown). At or before xenon breakthrough begins in the first adsorber vessel, the vent gas from the first vessel is fed to a second regenerated adsorber vessel. Xenon in the effluent from the first adsorber vessel is adsorbed in the second adsorber vessel, and operation of the first adsorber vessel is continued until the entire volume of adsorbent has been completely saturated with xenon at adsorber conditions. This maximizes the effective amount of xenon adsorbed in the vessel and increases the efficiency of the xenon recovery process. Once the first vessel has been saturated, it is removed, isolated, and prepared for shipment. The waste gas feed is sent directly to the second vessel, and a third adsorber vessel is connected in series with the second vessel. An appropriate valve and piping manifold assembly is utilized to carry the series operation described here.

Figure 6:
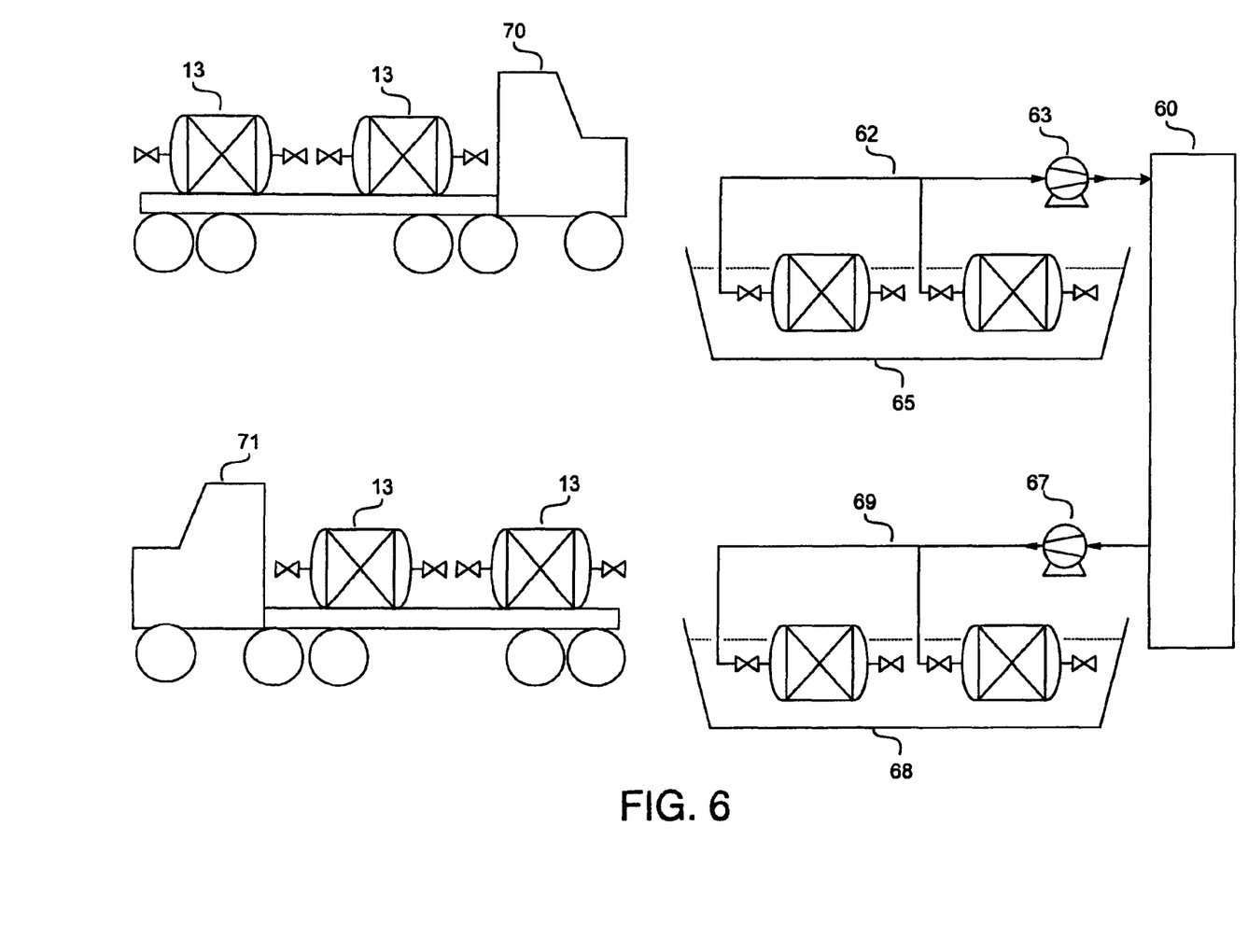
FIG. 6 is a schematic diagram of part of one embodiment of a recovery system adapted to recover and concentrate one or more desired components from a waste gas mixture according to aspects of the present invention.

FIG. 6 shows the isolated adsorber vessel 13 containing adsorbed xenon being transported via truck 70 to the central processing facility 60. At the central processing facility, the vessels are connected to a receiving manifold system 62. The receiving manifold system 62 may be purged and vented to eliminate air-based contaminants from the desorbed gas prior to regeneration of the adsorber vessel. Adsorber vessels 13 loaded with xenon also may arrive from other operating facilities, and the vessels may be attached to a process manifold 62 one at a time or multiple vessels may be attached to the manifold system and regenerated simultaneously.

The adsorbed components can be desorbed by reducing the gas pressure in the vessel 13 wherein gas is discharged by the pressure differential between the interior of the vessel and a receiver (not shown) at the central processing facility 60 that collects the gas, a step typically described as depressurization. Gas also may be withdrawn during regeneration by a vacuum system 63 to reduce the vessel pressure to <100 Torr and possibly <20 Torr. Lower pressures will increase the concentration of the recovered desired component in the withdrawn gas. It is beneficial to purge the adsorbent volume with a low flow rate of undesired gas (not shown) during the evacuation step, which promotes desorption and increases recovery of the desired component. It is also beneficial to increase the temperature of the adsorbent in the vessel during the evacuation and purging process. This can be accomplished by heating the external surface of the vessel, by using hot purge gas, by using internal heating coils in the vessel, or via a heated bath or any combination thereof. In FIG. 6, vessels 13 during the desorption step while attached to process manifold 62 are shown in a heated bath 65. The regeneration and desorption process can involve any combination of evacuation, purge and heating.

In order to increase the concentration of xenon in the desorbed gas, it may be desirable to reject portions of this gas during the desorption process. For example, the gas obtained during initial depressurization to 1 atm will consist mainly of the undesired component, because the adsorbent selectively adsorbs and retains the desired gas component. This initial portion of the desorption gas may be vented without significant loss of xenon, or it may be recycled as feed gas to another adsorber for capture of additional xenon. The remaining gas obtained during the evacuation and/or purge step will have a higher xenon concentration and would be the stream collected for further xenon separation and concentration.

Also shown in FIG. 6 is one embodiment of the system that can be used to perform the optional preadsorption step of the one or more nondesired components into the adsorbent vessels 13 from which the desired component has already been desorbed. As shown, the preadsorption step is performed at the central processing facility 60 after the recovery of the one or more desired component in the desorption step has been completed and prior to the transportation of the adsorption vessels 13 back to an operating facility via truck 71. As shown, compressor 67 will compress nondesired gas component(s) from a source (not shown) to a pressure at which the nondesired component(s) are introduced via manifold 69 into the adsorbent vessels 13. In the embodiment shown in FIG. 6, vessels 13 are located in a cooling bath 68 to facilitate the removal of heat generated during the introduction of pressurized nondesired gas into the adsorbent vessels 13 during the preadsorption step. After the preadsorption step is completed the undesired component containing adsorbent vessels 13 are loaded onto truck 71 and returned to the operating facility (not shown) to repeat the adsorbing the desired component and the rest of the steps for recovery of the desired component from a waste gas mixture. In an alternative embodiment, that is not shown the desorption equipment could be modified to be used for both the desorption and preadsorption steps at the central processing facility 60; thereby eliminating the need for two separate sets of equipment for those steps.

The following Examples illustrate aspects of the methods described above but do not limit these methods to any of the specific details described below.

EXAMPLE 1

One aspect of the method comprises shipping Xe-containing vessels from an operating facility or distributed plant area to a central processing facility. A significant cost is associated with shipment of the vessels. Evaluations were conducted to compare shipping Xe in conventional pressurized gas cylinders (termed "empty cylinders") or in adsorbent-filled vessels in which the adsorbent contains adsorbed Xe.

Calculations were conducted with in-house simulation software to estimate the amount of Xe that could be effectively loaded into adsorber vessel 13 packed with adsorbent. For the calculation, the vessel was assumed to contain commercially available carbon (PSC, from Calgon Corporation). Isotherm data for Xe and $N_2$ were measured and fit to a multicomponent adsorption isotherm model to describe the extent of adsorption on the carbon. Feed gas consisting of 1000 ppmv Xe in $N_2$ was used in the calculations. The "empty cylinder" base case consisted of simply compressing the feed gas to 2000 psig at 70° F. and storing it in a high pressure gas cylinder for transport to the central processing facility. The second case used a carbon-filled gas cylinder (same size) initially saturated at 2000 psig and 70° F. with $N_2$. The feed gas was then compressed and fed to adsorbent-filled adsorber vessel 13 at 2000 psig and 70° F., and the waste gas was rejected through flow control valve 19 shown in FIG. 3. The feed gas was stopped when Xe began to breakthrough in the effluent gas. Under these conditions, the adsorber bed remained at its initial temperature of 70° F. throughout the fill process.

The results showed that the empty cylinder can store 0.08 lb of Xe per cylinder, whereas the adsorbent-filled adsorber vessel 13 can store 1.7 lbs of Xe per vessel. The adsorbent-filled vessel is therefore equivalent to 21 pressurized cylinders containing no adsorbent. This means that the number of vessels needed to transport Xe to the central processing facility is dramatically reduced by a factor of 21 using the method described here.

EXAMPLE 2

Once an adsorbent-filled vessel is loaded with Xe, it must eventually be processed to recover the adsorbed Xe. In the current process this would occur either at the central processing facility or alternatively at the operating facility or distributed plant to generate a Xe-rich gas for subsequent transport to the central processing facility. Experiments were conducted to determine how effectively Xe can be desorbed from the adsorbent and what levels of Xe can be produced.

Figure 4:
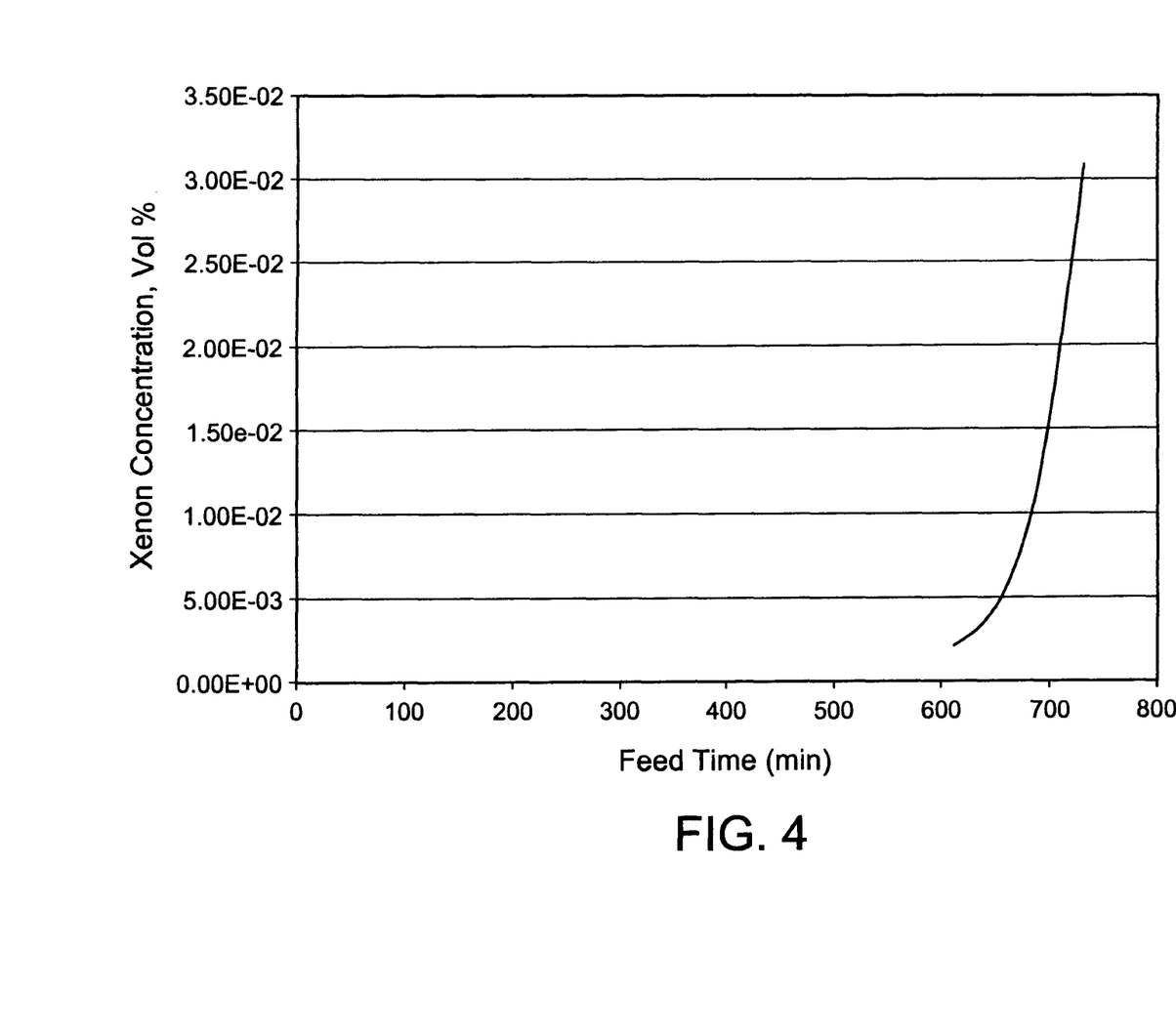
FIG. 4 is a breakthrough curve for the adsorption of xenon from a waste gas mixture containing 0.5 vol % xenon in nitrogen in Example 2.

The experiments were conducted in a 1.77 inch diameter by 12 inch long vessel packed with activated carbon adsorbent. The vessel contained provisions for external cooling and heating so the Xe feed step could be conducted at low temperature (~0° C.), while regeneration could be conducted at higher temperature (~100° C.). Feed gas consisting of 2 standard liters per minute (slpm) of 0.5 vol % Xe in $N_2$ was fed to the bed at 90 psig and 0° C. The level of Xe in the effluent gas was monitored by quadrupole mass spectrometry (QMS) and is plotted in FIG. 4. Xe is removed by the carbon adsorbent and starts breaking through the bed after about 600 minutes (10 hours) of operation.

Figure 5:
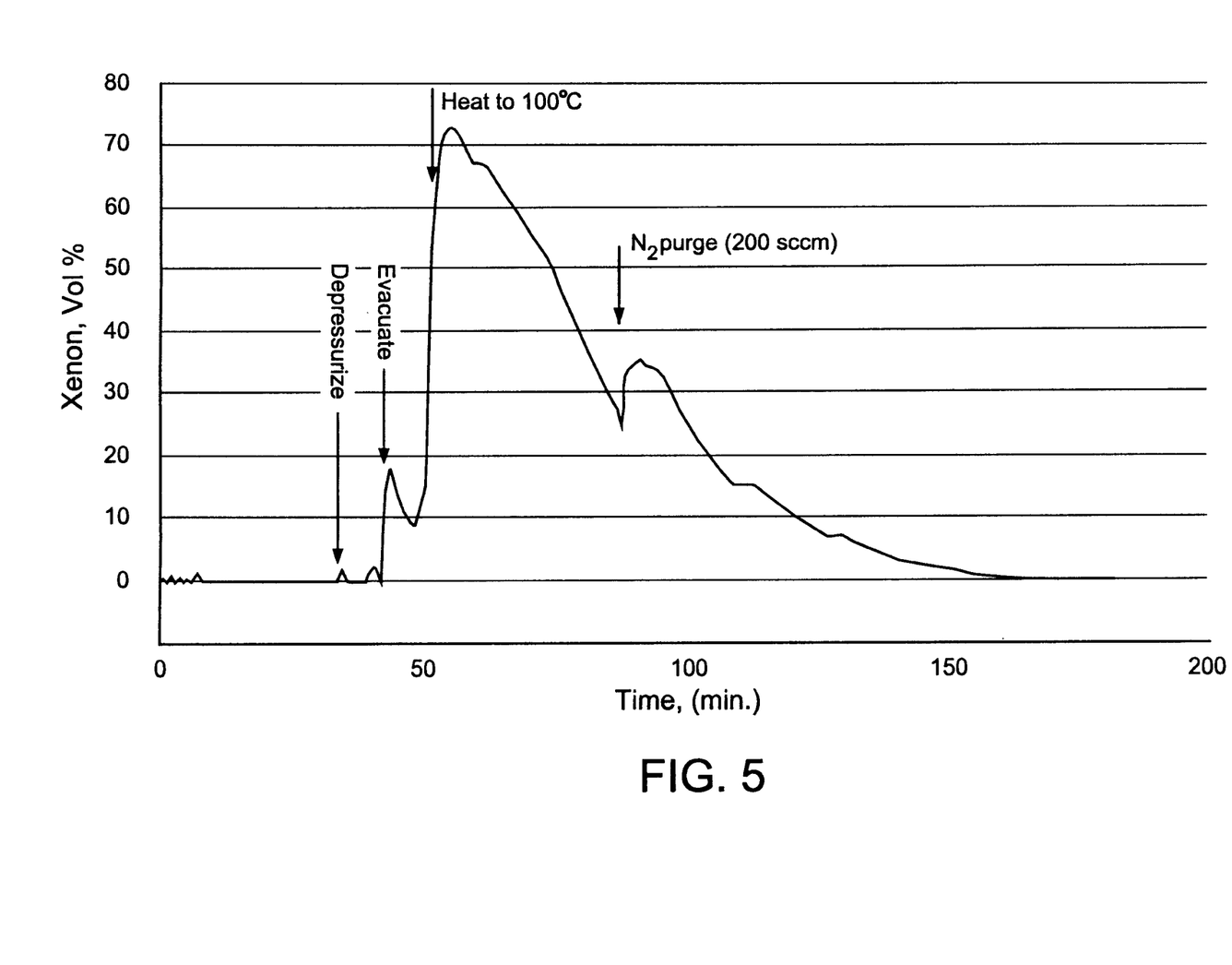
FIG. 5 is a plot of the xenon concentration in the effluent gas vs. time during an adsorbent bed regeneration of Example 2.

The bed was then isolated and subjected to regeneration steps to recover the Xe. Regeneration steps consisted of 1) depressurization to 1 atm, 2) evacuation to <10 Torr, 3) external heating to 100° C. while maintaining the pressure at <10 Torr, and finally purging with 200 sccm $N_2$ while maintaining the temperature at 100 C and the pressure at <10 Torr. The composition of the effluent stream during these steps was monitored using a Xenon sensor and is plotted in FIG. 5. The results show that high concentrations of Xe were produced during regeneration, particularly during the heating and purge steps. All of the gas produced during the regeneration step was collected, and the average concentration of Xe in that sample was 40 vol %, which was 80 times higher than the feed gas level of 0.5 vol %. The total amount of Xe collected during the regeneration step was 98% of the Xe that was fed to the vessel during the feed step. This example shows that an adsorbent-filled vessel can be used to generate a very Xe-rich regeneration gas with very high Xe recovery. This gas can be efficiently separated into high purity Xe in the central processing facility.

The invention claimed is:

1. A method for recovering a desired component from a waste gas mixture, wherein the method comprises
    (a) at an operating facility, introducing a waste gas comprising the desired component and one or more undesired components into an adsorber vessel containing an adsorbent material selective for the desired component, adsorbing at least a portion of the desired component in the adsorbent vessel, and withdrawing therefrom an effluent gas depleted in the desired component;
    (b) terminating the flow of waste gas into the adsorber vessel; and
    (c) recovering and concentrating the desired component by either
        (1) isolating the adsorber vessel, transporting the adsorber vessel to a central processing facility, withdrawing from the adsorber vessel an intermediate gas enriched in the desired component, and separating the desired component from the intermediate gas to provide a concentrated product gas further enriched in the desired component, or
        (2) withdrawing from the adsorber vessel an intermediate gas enriched in the desired component, compressing the intermediate gas and storing it in a pressure vessel, isolating the pressure vessel, transporting the pressure vessel to a central processing facility, withdrawing the intermediate gas from the pressure vessel, and separating the desired component from the intermediate gas to provide a concentrated product gas further enriched in the desired component;

wherein the operating facility is one of a plurality of operating facilities;

and further comprising adsorbing on the adsorbent material at least one other component prior to adsorbing the desired component in the adsorbent vessel in step (a), wherein the desired component is more strongly adsorbed by the adsorbent material than the other component, and wherein the adsorption of the other component is effected at the central processing facility to provide an adsorber vessel containing adsorbent material having the other component adsorbed thereon, the adsorber vessel is transported to said one of the operating facilities, and the waste gas is introduced into the adsorber vessel in step (a).

2. The method of claim 1 wherein the other component is one of the undesired components.

3. The method of claim 1 wherein the adsorption of the other component is effected at or below a selected pressure and the adsorption of the desired component is effected at a pressure equal to or greater than the selected pressure.

4. The method of claim 1 wherein the adsorption of the other component is effected at a selected pressure and the adsorption of the desired component is effected at a pressure less than the selected pressure.

5. The method of claim 1 wherein withdrawal of the intermediate gas enriched in the desired component is effected by regenerating the adsorbent material using depressurization, evacuation, heating, purging, or any combination thereof.

6. The method of claim 1 wherein the flow of waste gas into the adsorber vessel is terminated at breakthrough of the desired component.

7. The method of claim 1 wherein during step (a) is the step of introducing the effluent gas depleted in the desired component into an additional adsorber vessel connected to the adsorber vessel in series, said additional adsorber vessel containing the adsorbent material selective for the desired component; and wherein said terminating step (b) occurs at a time between from the breakthrough of the desired material to and including saturation of the adsorbent material in the adsorber vessel with the desired component; and after step (b) is the further step of initiating a flow of waste gas into the additional adsorber vessel; and an effluent gas depleted in the desired component is withdrawn from said additional adsorber vessel.

8. The method of claim 7 further comprising the steps of (1) connecting a third adsorber vessel in series with the additional adsorber and (2) introducing the effluent gas depleted in the desired component withdrawn from the additional adsorber vessel into the third adsorber vessel.

9. The method of claim 1 comprising one or more cooling steps selected from the group consisting of cooling the waste gas prior to introduction into the adsorber vessel, external cooling of the adsorber vessel, and internal cooling of the adsorber vessel.

10. The method of claim 1 wherein the desired component is selected from the group consisting of xenon, krypton, argon, helium, hydrogen, deuterium, arsine, phosphine, germane, $SF_6$, $SiH_4$, $H_2Se$, HF, $NF_3$, $CF_4$, $C_2F_6$, $C_3F_8$, and Fluothane® ($C_2HBrClF_3$).

11. The method of claim 1 wherein the one or more undesired components is selected or are selected from the group consisting of nitrogen, oxygen, hydrogen, helium, krypton, and argon.

12. The method of claim 11 wherein a desired component is xenon and an undesirable component is nitrogen.

13. The method of claim 1 wherein the separating of the desired component from the intermediate gas to provide the concentrated product gas further enriched in the desired component at the central processing facility is effected by cryogenic distillation.

14. A method for recovering a desired component from a waste gas mixture, wherein the method comprises
  (a) providing an adsorption-based recovery system at an operating facility wherein the operating facility is one of a plurality of operating facilities wherein the system is adapted to recover the desired component from a waste gas comprising the desired component and one or more undesired components, wherein the desired component is recovered and concentrated in a transportable vessel;
  (b) providing a central processing facility adapted to receive the transportable vessel, to withdraw therefrom an intermediate gas enriched in the desired component, and to separate the desired component from the intermediate gas to provide a concentrated product gas further enriched in the desired component;
  (c) introducing the waste gas into the adsorption-based recovery system at the operating facility and recovering and concentrating the desired component in the transportable vessel;
  (d) transporting the transportable vessel to the central processing facility; and
  (e) separating the desired component from the intermediate gas and providing the concentrated product gas further enriched in the desired component;

wherein during the introducing step and before the transporting step are the steps of:
  (1) introducing the waste gas into an adsorber vessel containing an adsorbent material selective for the desired component, adsorbing at least a portion of the desired component in the adsorbent vessel, and withdrawing from the adsorber vessel an effluent gas depleted in the desired component;
  (2) terminating the flow of waste gas into the adsorber vessel; and
  (3) isolating the adsorber vessel; and after the transporting step and before the separating step, is the step of withdrawing the intermediate gas from the adsorber vessel; and following said withdrawing of the intermediate gas from the adsorber vessel, is the step of pressurizing the adsorber vessel with a gas containing at least one other component, wherein the desired component is more strongly adsorbed by the adsorbent material than the other component, and further comprising the steps of isolating the adsorber vessel and transporting said adsorber vessel to one of the operating facilities for use in step (1).

15. The method of claim 14 wherein the at least one other component is one of the undesired components.

16. The method of claim 14 wherein the concentrated product gas is introduced into a pressure vessel and transported to one of the plurality of operating facilities for reuse in a process that generates the waste gas.

17. A method for recovering a desired component from a waste gas stream comprising the steps of
  (a) providing an adsorption-based recovery system at an operating facility wherein the system is adapted to recover the desired component from a waste gas comprising the desired component and one or more undesired components, wherein the desired component is recovered and concentrated in a transportable vessel;
  (b) providing a central processing facility adapted to receive the transportable vessel, to withdraw therefrom an intermediate gas enriched in the desired component, and to separate the desired component from the intermediate gas to provide a concentrated product gas further enriched in the desired component;
(c) introducing the waste gas into the adsorption-based recovery system at the operating facility and recovering and concentrating the desired component in the transportable vessel;
(d) transporting the transportable vessel to the central processing facility; and
(e) separating the desired component from the intermediate gas and providing the concentrated product gas further enriched in the desired component;
wherein at the operating facility (1) the waste gas is introduced into an adsorber vessel containing an adsorbent material selective for the desired component, adsorbing at least a portion of the desired component in the adsorbent vessel, and withdrawing therefrom an effluent gas depleted in the desired component;
(2) the flow of waste gas into the adsorber vessel is terminated;
(3) an intermediate gas enriched in the desired component is withdrawn from the adsorber vessel, the intermediate gas is compressed and stored in a pressure vessel, and the pressure vessel is isolated; and
(4) the pressure vessel is transported to the central processing facility, the intermediate gas is withdrawn from the pressure vessel, and the desired component is separated from the intermediate gas to provide the concentrated product gas further enriched in the desired component.

* * * * *